(12) United States Patent
Kusuda

(10) Patent No.: US 11,867,090 B2
(45) Date of Patent: Jan. 9, 2024

(54) STATOR VANE AND AIRCRAFT GAS TURBINE ENGINE

(71) Applicant: IHI Corporation, Tokyo (JP)

(72) Inventor: Shinya Kusuda, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/808,114

(22) Filed: Jun. 22, 2022

(65) Prior Publication Data

US 2022/0316351 A1 Oct. 6, 2022

Related U.S. Application Data

(63) Continuation of application No. PCT/JP2021/007122, filed on Feb. 25, 2021.

(30) Foreign Application Priority Data

Apr. 1, 2020 (JP) .................................. 2020-065756

(51) Int. Cl.
*F01D 9/04* (2006.01)

(52) U.S. Cl.
CPC ........ *F01D 9/041* (2013.01); *F05D 2220/323* (2013.01); *F05D 2240/129* (2013.01); *F05D 2260/96* (2013.01)

(58) Field of Classification Search
CPC ..... F01D 9/00; F01D 9/02; F01D 9/04; F01D 9/041; F01D 9/042; F01D 5/14; F01D 5/141; F01D 5/142; F05D 2240/129; F05D 2260/96; F05D 2220/323; F04D 29/54;

(Continued)

(56) References Cited

U.S. PATENT DOCUMENTS

| 10,247,018 B2 | 4/2019 | Topol et al. |
| 2008/0181780 A1 | 7/2008 | Sonoda et al. |
| 2013/0219922 A1 | 8/2013 | Gilson et al. |

(Continued)

FOREIGN PATENT DOCUMENTS

| JP | 2001-234893 A | 8/2001 |
| JP | 2003-172206 A | 6/2003 |

(Continued)

OTHER PUBLICATIONS

International Search Report dated May 11, 2021 in PCT/JP2021/007122 filed on Feb. 25, 2021, 2 pages.

*Primary Examiner* — Elton K Wong
(74) *Attorney, Agent, or Firm* — Oblon, McClelland, Maier & Neustadt, L.L.P.

(57) ABSTRACT

A stator vane provided rearward of a rotor blade, includes: an airfoil body having an airfoil profile. The maximum airfoil thickness position of the airfoil body on the airfoil profile satisfies following conditions at least on a tip side of the airfoil body: (a) on a plane expanded in a circumferential direction in which the stator vane is arranged, the position is located in a first region which is close to a trailing edge of the airfoil body from an intersection of the airfoil body and a line which is parallel to an extension line of a camber line of the rotor blade at a trailing edge of the rotor blade and passes through a leading edge of another stator vane adjacent in the circumferential direction, and (b) the position is located in a second region having a chord ratio from 0.2 to 0.8.

7 Claims, 5 Drawing Sheets

(58) Field of Classification Search
CPC .... F04D 29/541; F04D 29/542; F04D 29/544; F02K 3/06
See application file for complete search history.

(56) References Cited

U.S. PATENT DOCUMENTS

| | | |
|---|---|---|
| 2013/0259668 A1 | 10/2013 | Myoren et al. |
| 2014/0219792 A1 | 8/2014 | Topol et al. |
| 2016/0090909 A1 | 3/2016 | Gilson et al. |
| 2016/0194962 A1* | 7/2016 | Cojande ............... F01D 5/141 |
| | | 415/208.1 |
| 2016/0363137 A1 | 12/2016 | Topol et al. |
| 2017/0097011 A1 | 4/2017 | Pallot et al. |
| 2019/0024581 A1 | 1/2019 | Gilson et al. |
| 2020/0386154 A1 | 12/2020 | Gilson et al. |
| 2021/0372323 A1 | 12/2021 | Gilson et al. |
| 2022/0010685 A1* | 1/2022 | Soulat .................. F01D 5/141 |

FOREIGN PATENT DOCUMENTS

| | | |
|---|---|---|
| JP | 2007-298025 A | 11/2007 |
| JP | 2016-530440 A | 9/2016 |
| JP | 6468414 B2 | 2/2019 |
| WO | WO 2012/053024 A1 | 4/2012 |

* cited by examiner

STATOR VANE AND AIRCRAFT GAS TURBINE ENGINE

CROSS REFERENCE TO RELATED APPLICATIONS

This application is a continuation application of International Application No. PCT/JP2021/007122, now WO2021/199802, filed on Feb. 25, 2021, which claims priority to Japanese Patent Application No. 2020-065756, filed on Apr. 1, 2020, the entire contents of which are incorporated by reference herein.

BACKGROUND

1. Technical Field

The present disclosure relates to a stator vane of an aircraft gas turbine engine, and the aircraft gas turbine engine.

2. Description of the Related Art

Environmental criteria for aircrafts have been gradually strengthened by requests for conservation of living environment or the like. Noise from an aircraft gas turbine engine (i.e., aircraft jet engine) is one of the objects of the criteria and is also required to be reduced.

Gas turbine engines installed in commercial aircrafts in recent years are mainly turbofan engines that provide good propulsion performance and fuel efficiency. The turbofan engine has a fan to obtain forward thrust. Stator vanes (fan stator vanes) of a fan are provided rearward of rotor blades (fan blades) of the fan. During the operation of the fan, noise (rotor-stator interaction sound) is generated by the aerodynamic interaction of both airfoils.

US 2019/0024581 A1 discloses an outlet guide vane intended to reduce the above-described rotor-stator interaction sound.

SUMMARY

The rotor-stator interaction sound is generated by periodic interaction between a wake (i.e., a velocity defect region) of a rotor blade and a stator vane (e.g., an outlet guide vane) provided rearward of the rotor blade. In addition, the rotor-stator interaction sound is generated not only in the fan but also in other rotating machinery such as a compressor and a turbine. Generally, it is known that the sound pressure level of the rotor-stator interaction sound increases in proportion to the sixth power of a flow velocity when a sound source is a dipole sound source, and increases in proportion to the eighth power of a flow velocity when a sound source is a quadrupole sound source. On the other hand, a decrease in exhaust velocity directly leads to a decrease in thrust. Therefore, it is required to reduce noise while avoiding the fluctuation of the exhaust velocity.

It is an object of the present disclosure to provide a stator vane of an aircraft gas turbine engine and an aircraft gas turbine engine capable of reducing noise generated when a rotating machinery such as a fan is operated.

A stator vane according to the present disclosure provided rearward of a rotor blade, includes: an airfoil body having an airfoil profile, wherein a maximum airfoil thickness position of the airfoil body in the airfoil profile satisfies following conditions at least on a tip side of the airfoil body: (a) on a plane expanded in a circumferential direction in which the stator vane is arranged, the maximum airfoil thickness position is located in a region which is close to a trailing edge of the airfoil body from an intersection of the airfoil body and a line which is parallel to an extension line of a camber line of the rotor blade at a trailing edge of the rotor blade and passes through a leading edge of another stator vane adjacent in the circumferential direction, and (b) the maximum airfoil thickness position is located in a region having a chord ratio from 0.2 to 0.8. Here, the chord ratio is a value obtained by dividing a distance from the leading edge of the airfoil body to an arbitrary position on a chord of the airfoil body by a chord length of the airfoil body.

The airfoil body may have the airfoil profile satisfying the conditions from a tip side of the airfoil body to a hub side of the airfoil body. The chord ratio of the maximum airfoil thickness position on the tip side of the airfoil body may be larger than the chord ratio of the maximum airfoil thickness position on the hub side of the airfoil body. The stator vane may be a fan stator vane.

An aircraft gas turbine engine according to the present disclosure includes: a fan blade; a fan case accommodating the fan blade; a core case configured to accommodate a core engine provided rearward of the fan blade and defines a bypass passage of the working fluid between the core case and the fan case; and a stator vane according to the present disclosure as a fan stator vane provided rearward of the rotor blade in the bypass passage.

According to the present disclosure, it is possible to provide a stator vane of an aircraft gas turbine engine and an aircraft gas turbine engine capable of reducing noise generated when a rotating machinery such as a fan is operated.

BRIEF DESCRIPTION OF THE DRAWINGS

FIGS. 3A and 3B are views illustrating a relationship between an inclination of a rotor blade and a position of the maximum airfoil thickness of the stator vane with respect to an axial direction, wherein FIG. 3A is a sectional view taken along line IIIA-IIIA (a cross-sectional view on the tip side) as shown in FIG. 1 and FIG. 3B is a sectional view taken along line IIIB-IIIB (a cross-sectional view on the hub side) as shown in FIG. 1.

FIGS. 4A, 4B and 4C are graphs showing surface Mach number distributions on a suction side (SS) and a pressure side (PS) of a stator vane according to the present embodiment and on those of a stator vane of a conventional example, wherein FIGS. 4A, 4B and 4C show the surface Mach number distributions at 90% span, 50% span, and 10% span, respectively.

DESCRIPTION OF THE EMBODIMENTS

Hereinafter, exemplary embodiments will be described with reference to the drawings. For convenience of explanation, a turbofan engine is adopted as an example of an aircraft gas turbine engine according to the present embodiment. Further, the turbofan engine is simply referred to as an "engine". It should be noted that the turbofan engine according to the present embodiment may be a geared turbofan engine or other gas turbine engines having a fan. In any case, the bypass ratio does not matter. Furthermore, the stator vane according to the present embodiment can be applied not only to a fan which is rotating machinery (axial flow machine) but also to other rotating machinery (axial flow machines) such as a low-pressure compressor, a high-pressure compressor, a high-pressure turbine, and a low-pressure turbine.

Figure 1:
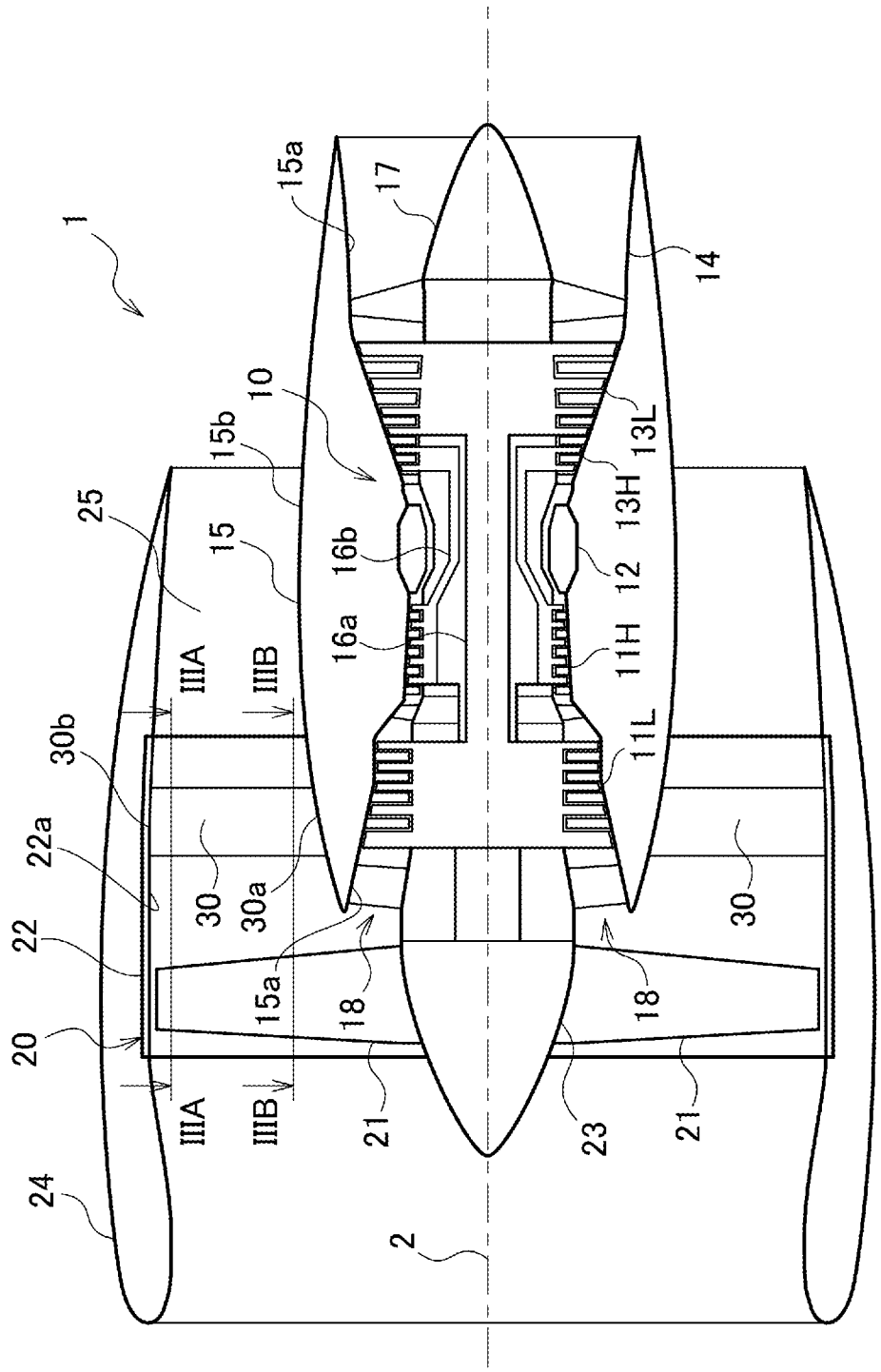
FIG. 1 is a schematic cross-sectional view of an aircraft gas turbine engine according to an embodiment of the present disclosure.

FIG. 1 is a schematic cross-sectional view of an engine 1 according to this embodiment. As shown in this figure, the engine 1 includes a core engine 10 and a fan 20 provided forward of the core engine 10. The core engine 10 includes a low-pressure compressor 11L, a high-pressure compressor 11H, a combustor 12, a high-pressure turbine 13H, a low-pressure turbine 13L, and a core nozzle 14. These are housed in a core case 15 and arranged along the axis 2. In other words, they are arranged from an upstream side (i.e., a forward or a left side in FIG. 1) to a downstream side (i.e., a rearward or a right side in FIG. 1) of the mainstream of the working fluid (i.e., air or combustion gas). The core engine 10 according to the present embodiment is a multi-stage turbine engine. Therefore, the number of stages of compressors and turbines may be, for example, two or three. For convenience of explanation, an extending direction of the axis is defined as the axial direction AD. A circumferential direction about the axis 2 is defined as a circumferential direction CD. The rotational direction RD of each rotor blade (including a fan blade) described later is assumed to coincide with the circumferential direction CD.

The low-pressure compressor 11L includes rotor blades fixed to a low-pressure shaft 16a and stator vanes fixed to an outer wall of the low-pressure compressor 11L. The stator vanes and the rotor blades of the low-pressure compressor 11L are alternately disposed along the axis 2, and both are arranged in the circumferential direction CD. The low-pressure compressor 11L compresses the working fluid flowing into a front core passage 18 and supplies it to the high-pressure compressor 11H.

The high-pressure compressor 11H is provided rearward of the low-pressure compressor 11L. The high-pressure compressor 11H includes rotor blades fixed to a high-pressure shaft 16b and stator vanes fixed to an outer wall of the high-pressure compressor 11H. Similar to the low-pressure compressor 11L, the stator vanes and the rotor blades of the high-pressure compressor 11H are alternately disposed along the axis 2, and both are arranged in the circumferential direction CD. The high-pressure compressor 11H further compresses the working fluid compressed by the low-pressure compressor 11L and supplies it to the combustor 12.

The combustor 12 is connected with a fuel supply system (not shown). The combustor 12 includes an ignitor (not shown), mixes the working fluid compressed by the high-pressure compressor 11H with fuel, and combusts the mixed gas. The generated combustion gas is discharged to the high-pressure turbine 13H.

The high-pressure turbine 13H is provided rearward of the combustor 12. The high-pressure turbine 13H includes rotor blades fixed to the high-pressure shaft 16b and stator vanes fixed to an outer wall of the high-pressure turbine 13H. The rotor blades and the stator vanes of the high-pressure turbine 13H are alternately disposed along the axis 2, and both are arranged in the circumferential direction CD. The combustion gas passes through the rotor blades and the stator vanes of the high-pressure turbine 13H while being expanding. In the process of passing, the combustion gas rotates the rotor blades of the high-pressure turbine 13H, and this rotational force is transmitted to the high-pressure compressor 11H via the high-pressure shaft 16b. Accordingly, the rotor blades of the high-pressure compressor 11H is rotated to compress the working fluid.

The low-pressure turbine 13L is provided rearward of the high-pressure turbine 13H. The low-pressure turbine 13L includes rotor blades fixed to the low-pressure shaft 16a and stator vanes fixed to the outer wall of the low-pressure turbine 13L. The rotor blades and the stator vanes of the low-pressure turbine 13L are alternately disposed along the axis 2, and both are arranged in the circumferential direction CD. The combustion gas discharged from the high-pressure turbine 13H passes through the rotor blades and the stator vanes of the low-pressure turbine 13L while being expanding. In the process of passing, the combustion gas rotates the rotor blades of the low-pressure turbine 13L, and this rotational force is transmitted to the low-pressure compressor 11L via the low-pressure shaft 16a. Accordingly, the rotor blades of the low-pressure compressor 11L is rotated to compress the working fluid.

The low-pressure shaft 16a is located radially inward of the high-pressure shaft 16b. The low-pressure shaft 16a and the high-pressure shaft 16b are coaxially located about the axis 2, and are rotatably supported by support members such as bearings (not shown). As described above, the low-pressure shaft 16a connects between the low-pressure compressor 11L (the rotor blades of the low-pressure compressor 11L) and the low-pressure turbine 13L (the rotor blades of the low-pressure turbine 13L). Similarly, the high-pressure shaft 16b connects between the high-pressure compressor 11H (the rotor blades of the high-pressure compressor 11H) and the high-pressure turbine 13H (the rotor blades of the high-pressure turbine 13H).

The core nozzle 14 is provided on the downstream side of the low-pressure turbine 13L. The core nozzle 14 is an annular flow passage formed of a tail cone 17 provided at the center thereof and a rearmost part of the core case 15. The core nozzle 14 discharges the combustion gas flowing out of the low-pressure turbine 13L toward the rear of the core engine 10.

As shown in FIG. 1, the fan 20 includes rotor blades (fan blades) 21 and a fan case 22. The rotor blades 21 are attached to a fan rotor 23 and radially arranged around the axis 2. The fan rotor 23 is connected to the low-pressure shaft 16a. As the low-pressure shaft 16a rotates, the rotor blades 21 and the fan rotor 23 are rotated integrally. With the rotation of the rotor blades 21, the working fluid flows into the nacelle 24 from the outside of the engine 1, and part of the working fluid is guided into the core passage 18 in the core case 15.

The fan case 22 is a hollow cylindrical member extending along the axis 2, and surrounds a row of rotor blades 21. That is, the maximum diameter of the fan case 22 is set to be larger than a diameter of a circle including tips of the rotor blades 21. The length of the fan case 22 along the axis 2 has a length that accommodates at least the rotor blades 21, an upstream part of the core case 15, and stator vanes 30. That is, the fan case 22 accommodates not only the rotor blades (fan blades) 21, but also part of the core engine 10 provided rearward of the rotor blades 21, and defines a bypass passage 25 with respect to the core case 15. The fan case 22 is attached and housed in the nacelle 24. The stator vanes (fan stator vanes) 30 are provided in the bypass passage 25.

The core case 15 accommodates (covers) rotating machinery such as the low-pressure compressor 11L and the combustor 12, which constitutes the core engine 10. The core case 15 has a tubular (hollow cylindrical) shape centered on the axis 2. The core case 15 has an inner surface 15a and an outer surface 15b. The inner surface 15a constitutes a flow passage of the working fluid taken into the core engine 10, that is, part of the wall surface of the core passage 18. On the other hand, the outer surface 15b is located radially outward of the inner surface 15a and served as a wall surface constituting the bypass passage 25.

The engine 1 (in other words, the fan 20) includes the stator vane (fan stator vanes) 30 according to the present embodiment.

The stator vanes 30 are arranged in the circumferential direction CD to regulate the flow of the working fluid discharged from the rotor blades 21. The stator vanes 30 are located rearward of the rotor blades 21 and extend from the outer surface 15b of the core case 15 to the inner surface 22a of the fan case 22. The stator vanes 30 are provided in the bypass passage 25, for example, as an outlet guide vane (OGV). In this case, the hub 30a of the stator vane 30 is attached to the outer surface 15b of the core case 15, and the tip 30b of the stator vane 30 is attached to the inner surface 22a of the fan case 22. However, the hub 30a and tip 30b of the stator vane 30 may be supported by corresponding other structural members.

Figure 2:
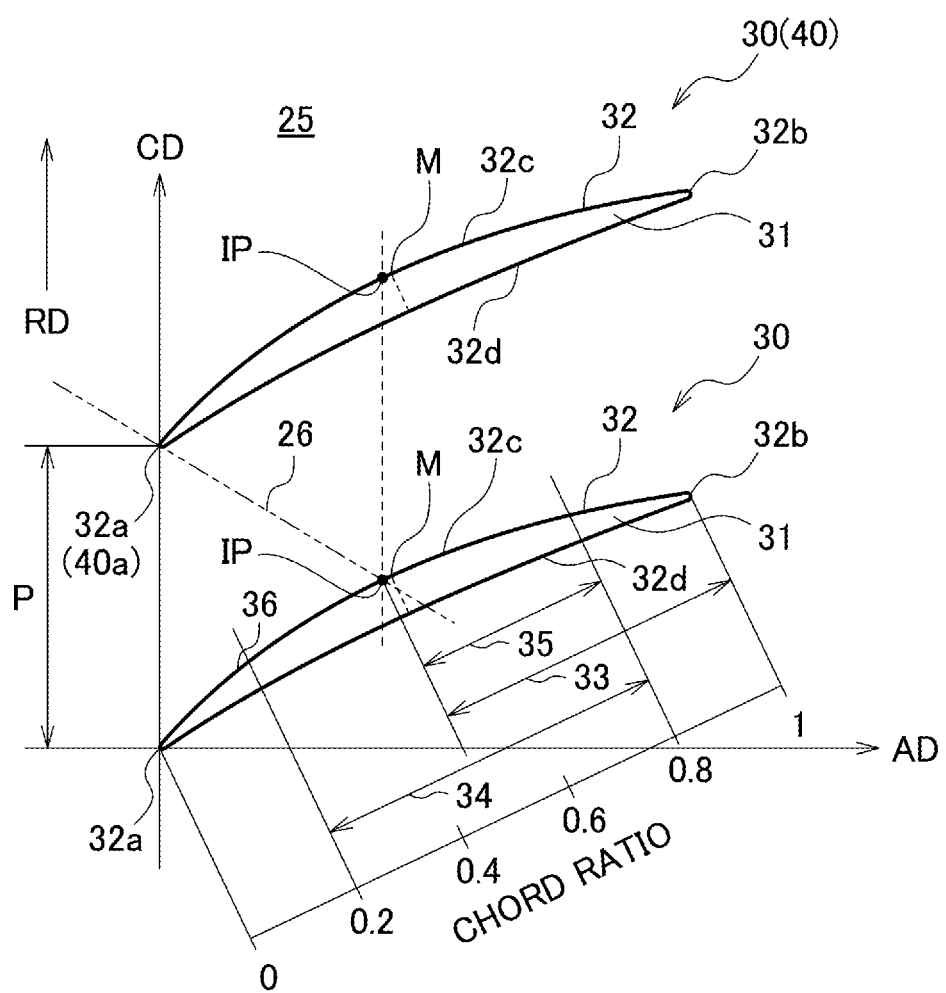
FIG. 2 is a view illustrating a stator vane according to an embodiment of the present disclosure.
Figure 3A:
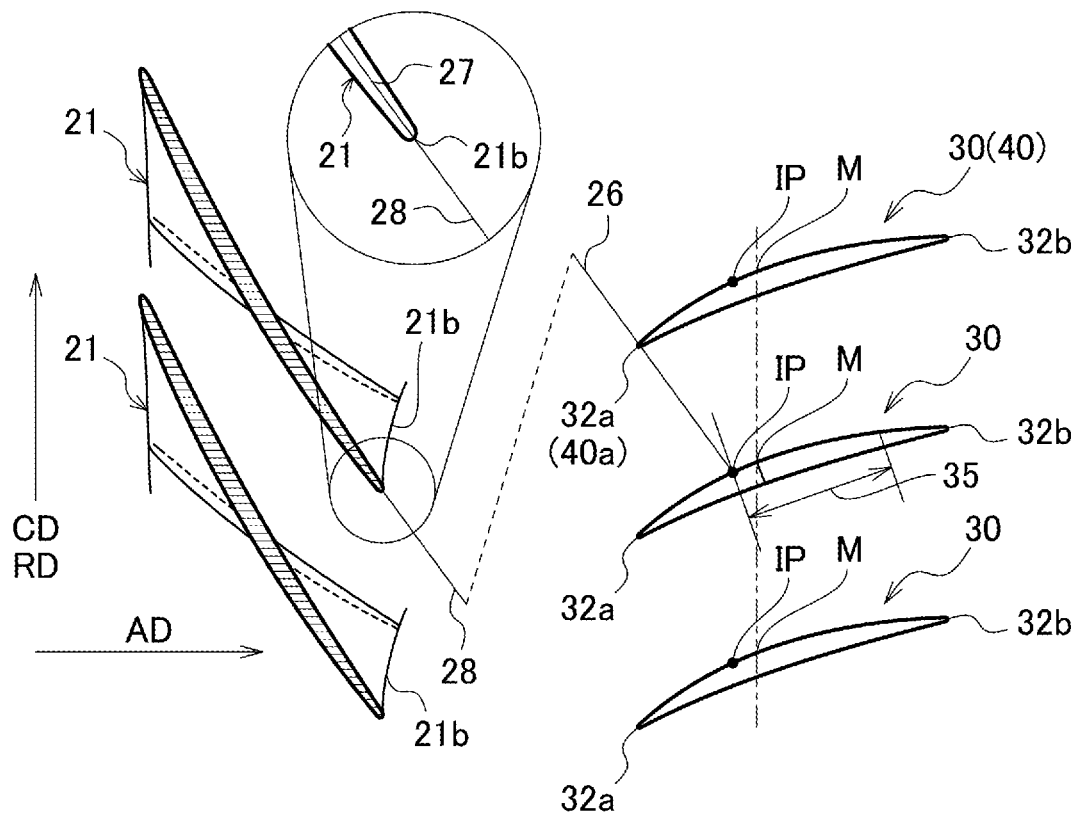
Figure 3B:
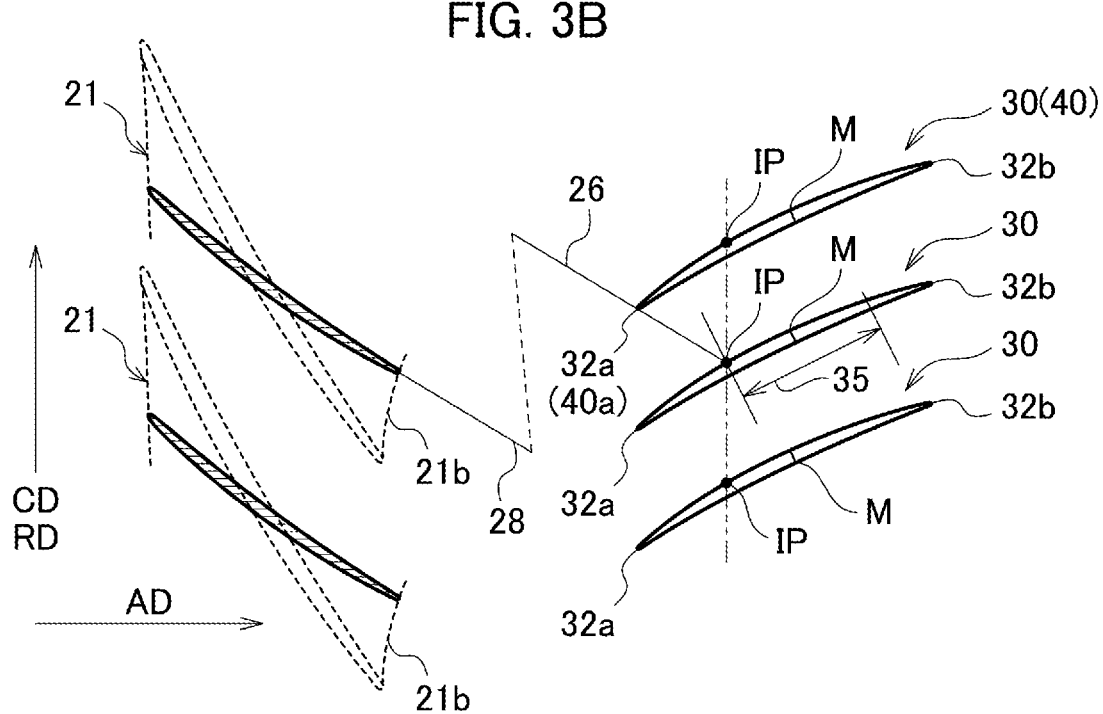

FIG. 2 is a view illustrating the stator vane 30 according to the present embodiment. FIG. 2 is also a development diagram in the circumferential direction CD. FIGS. 3A and 3B are views illustrating a relationship between an inclination of the rotor blade 21 and a position of the maximum airfoil thickness of the stator vane 30 (hereinafter, the maximum airfoil thickness position) M with respect to the axial direction AD. FIG. 3A is a sectional view taken along line IIIA-IIIA (a cross-sectional view on the tip side) as shown in FIG. 1. FIG. 3B is a sectional view taken along line IIIB-IIIB (a cross-sectional view on the hub side) as shown in FIG. 1. In other words, FIG. 3A is a sectional view of a portion of the stator vane 30 near the tip 30b. FIG. 3B is a sectional view of a portion of the stator vane 30 near the hub 30a. As shown in FIG. 1, FIGS. 3A and 3B are cross-sectional views parallel to the axis 2.

The stator vane 30 includes an airfoil body 32 having an airfoil profile (airfoil cross section) 31 shown in FIG. 2. The stator vanes 30 are arranged in the circumferential direction CD at a predetermined pitch P. The airfoil body 32 includes a leading edge 32a, a trailing edge 32b, a suction side (negative pressure surface) 32c, and a pressure side (positive pressure surface) 32d. The suction side 32c and the pressure side 32d extend from the leading edge 32a to the trailing edge 32b. The suction side 32c is a convex surface curved generally toward the rotational direction RD (see FIGS. 3A and 3B) of the rotor blade (i.e., forward of the circumferential direction CD). The pressure side 32d is a concave surface also curved generally toward the rotational direction RD (see FIGS. 3A and 3B) of the rotor blade 21 (i.e., forward of the circumferential direction CD). That is, the suction side 32c and the pressure side 32d are both curved in the same direction.

The airfoil profile 31 of the airfoil body 32 satisfies the following conditions at least on the tip 30b side. In other words, the airfoil body 32 has the airfoil profile 31 satisfying the following conditions at least on the tip 30b side.
<Condition>

On a plane expanded (developed) in the circumferential direction CD in which the stator vanes 30 are arranged, the maximum airfoil thickness position M of the airfoil body 32 is:

(a) located in a first region 33 which is close to the trailing edge 32b of the airfoil body 32 from an intersection IP of a line 26 and the airfoil body 32, and (b) located in a second region 34 having a chord ratio from 0.2 to 0.8.

In other words, the maximum airfoil thickness position M is located in a third region 35 where the first region 33 and the second region 34 overlap each other. Here, the line 26 is a virtual line, which is parallel to an extension line 28 of a camber line (airfoil centerline) 27 of one rotor blade 21 at the trailing edge 21b and passes through a leading edge 40a of another stator vane 40 adjacent in the circumferential direction CD (see FIGS. 3A and 3B). The extension line 28 is tangent to the camber line 27 at the trailing edge 21b and extends rearward from the trailing edge 21b. The chord ratio is a value obtained by dividing a distance from the leading edge 32a of the airfoil body 32 to an arbitrary position on the chord of the airfoil body 32 by the chord length of the airfoil body 32. The stator vane 40 described above is one of the stator vanes 30 arranged in the circumferential direction CD, and is located forward in the circumferential direction CD by a pitch P from the stator vane 30 of interest. The lower limit value and the upper limit value of the chord ratio in the second region 34 are set to suppress induction of separation caused by the reason in that a distance from the maximum airfoil thickness position M to the leading edge 32a or a distance from the maximum airfoil thickness position M to the trailing edge 32b becomes extremely short.

Compared the airfoil profile 31 of the present embodiment with a conventional airfoil profile at the same span position in a span direction (i.e., radial direction) of their stator vanes, the maximum airfoil thickness position M of the present embodiment is shifted closer to the trailing edge 32b than the maximum airfoil thickness position of the conventional stator vane because of the above conditions. If the maximum airfoil thicknesses of these airfoil profiles are the same, the leading edge 32a of the present embodiment is sharper than the blunt leading edge formed in the conventional stator vane. That is, according to the present embodiment, as compared with the conventional stator vane, the portion 36 having a thin airfoil thickness formed near the leading edge 32a is enlarged from the leading edge 32a toward the trailing edge 32b.

When the working fluid passes through the row (cascade) of rotor blades, a wake is generated behind each rotor blade. Since the wake and the mainstream of the working fluid alternately collide with the stator vane, the pressure fluctuates periodically in the vicinity of the stator vane, and a sound (so-called rotor-stator interaction sound) is generated. The generated sound propagates back and forth in the bypass passage, and leaks to the outside of the engine, thereby becoming noise.

A dipole sound source or a quadrupole sound source can be assumed as a sound source model of the above-mentioned sound. The dipole or quadrupole source is a source of pressure oscillations caused by flow disturbances such as wakes and vortices. It is known that the sound pressure level of the dipole sound source is proportional to the sixth power of the velocity of the working fluid. Similarly, it is known that the sound pressure level of the quadrupole sound source is proportional to the eighth power of the velocity of the working fluid. In the present embodiment, by enlarging the portion 36 having a thin rotor blade thickness based on the above two conditions, the working fluid flowing in the vicinity of the leading edge 32a of the stator vane 30 can be decelerated and the sound pressure can be reduced.

Figure 4A:
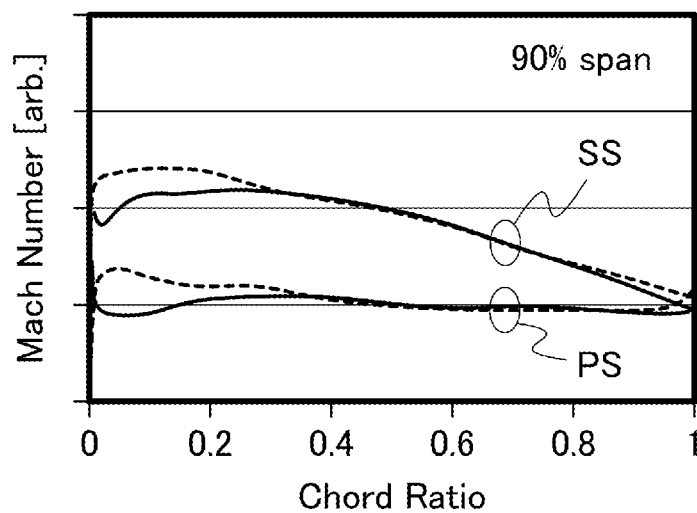
Figure 4B:
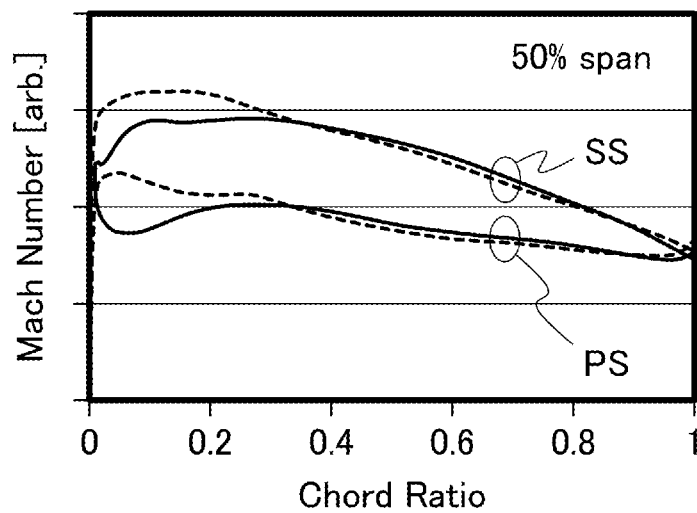
Figure 4C:
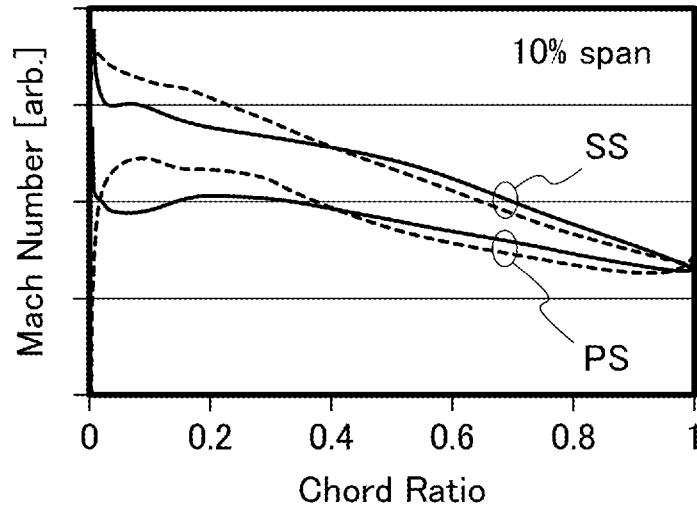

FIGS. 4A, 4B and 4C are graphs showing surface Mach number distributions on a suction side (SS) and a pressure side (PS) of a stator vane 30 according to the present embodiment and on those of a stator vane of a conventional example. The ordinate represents the surface Mach number, and the abscissa represents the chord ratio as described above. The solid line shows the surface Mach number distribution of the stator vane 30 according to the present embodiment. The dotted line shows the surface Mach number distribution of the stator vane of the conventional example. In the figure, "~% span" refers to a distance from the hub (base) along the span direction based on the span length as the standard. Thus, 90% span, 50% span, and 10% span refer to positions near the tip of the airfoil body, at the center of the airfoil body, and near the hub of the airfoil body, respectively.

The stator vane 30 according to the present embodiment satisfies conditions (a) and (b), and the maximum airfoil thickness position at 90% span is located at a position (i.e., 42% chord length) of the chord ratio 0.42. The stator vane of the conventional example has the same maximum airfoil thickness as that of the stator vane 30 according to the present embodiment and satisfies the above-mentioned condition (b). However, it does not satisfy the condition (a). That is, the maximum airfoil thickness position of the stator vane of the conventional example is located in a region closer to the leading edge than the intersection of the stator vane of the conventional example and a line in the conventional example corresponding to the line 26 of the present embodiment.

FIG. 4A shows the surface Mach number distributions at 90% span on the suction side (SS) and pressure side (PS) of the stator vane 30 according to the present embodiment and those of the stator vane of the conventional example. As shown in this figure, it is understood that the surface Mach number distribution in the vicinity of the leading edge 32a of the stator vane 30 according to the present embodiment is smaller than that of the stator vane of the conventional example. This decrease appears in both the suction side 32c and the pressure side 32d. According to the computational fluid dynamics (CFD) analysis, the sound pressure distribution in the vicinity of the leading edge 32a also decreases compared with the conventional example. That is, according to the present embodiment, by defining the maximum airfoil thickness position that satisfies the above two conditions, noise can be reduced more than that of the stator vane that does not satisfy the above two conditions.

The airfoil body 32 may have the airfoil profile 31 which satisfies the above conditions and is provided from the tip 30b side of the airfoil body 32 to the hub 30a side of the airfoil body 32. For example, the airfoil profile 31 at 50% span assumed in FIG. 4B satisfies conditions (a) and (b), and the maximum airfoil thickness position is located at the position of the chord ratio 0.42 (i.e., 42% chord length). Similarly, the airfoil profile 31 at the 10% span assumed in FIG. 4C satisfies conditions (a) and (b), and the maximum airfoil thickness position is located at the position of the chord ratio 0.53 (i.e., 53% chord length).

Figure 5:
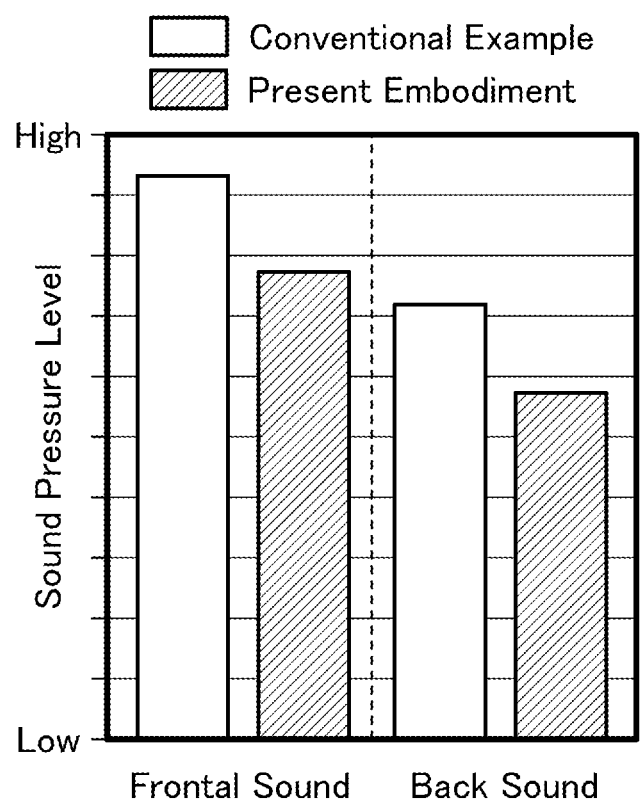
FIG. 5 is a graph showing results of numerical analysis of the sound pressure levels by the stator vane according to the embodiment and those by the stator vane of the conventional example.

As shown in FIGS. 4B and 4C, it can be seen that the surface Mach number distributions in the vicinity of the leading edge 32a at the center and on the hub side of the airfoil body 32 are smaller than those of the stator vane of the conventional example. In addition, the reduction of the sound pressure levels is also obtained in the computational fluid dynamics (CFD) analysis, as same as the result at 90% span. Therefore, the sound pressure level can be further reduced by forming the airfoil profile 31 satisfying the above conditions over the entire area in the span direction of the airfoil body 32. FIG. 5 shows a graph as the evidence. The graph shows the results of numerical analysis of the sound pressure levels of the stator vane 30 according to the present embodiment and those of the stator vane of the conventional example. The stator vane 30 assumed in FIG. 5 has the airfoil profile 31 satisfying the above conditions over the entire area in the span direction. FIG. 5 shows the sound pressure levels of a harmonic sound of the blade passage frequency (BPF), which is one component of the rotor-stator interaction sound. The left side of the figure shows a comparison result of the sound pressure levels in front of the stator vane (in other words, the sound pressure levels of frontal sounds). The right side of the figure shows a comparison result of the sound pressure levels behind the stator vane (in other words, the sound pressure levels of back sounds). As shown in this figure, the sound pressure levels are decreased both in front of and behind the stator vane.

MODIFIED EXAMPLE

The chord ratio of the maximum airfoil thickness position M on the tip 30b side of the airfoil body 32 may be larger than that on the hub 30a side of the airfoil body 32. For example, the chord ratio of the maximum airfoil thickness position M may continuously increase from the hub 30a toward the tip 30b. As described above, the sound source model for sounds generated by the flow of the working fluid between the rotating rotor blades 21 and the stator vanes 30 may assume a dipole or quadrupole sound source. The sound pressure levels of these sound sources are proportional to the sixth and eighth power of the flow velocity, respectively. On the other hand, the velocity of the rotor blade 21 at each position in the span direction increases in proportion to the distance from the axis 2. That is, the flow velocity of the working fluid is larger on the tip 30b side of the rotor blade 21 than on the hub 30a side of the rotor blade 21. Therefore, by enlarging the portion 36 on the tip 30b side of the stator vane 30 toward the trailing edge 32b more than the portion 36 on the hub 30a side, it is possible to promote the suppression of noise on the tip 30b side while suppressing the separation of the working fluid on the hub 30a side.

As described above, the stator vane according to the present embodiment can be applied to any one of the low-pressure compressor 11L, the high-pressure compressor 11H, the high-pressure turbine 13H, and the low-pressure turbine 13L. That is, at least one of the rotating machinery may include rotor blades and stator vanes, the stator vane being provided rearward of the rotor blades and each having an airfoil body satisfying conditions (a) and (b) as described above.

Although some embodiments have been described, embodiments may be modified or modified based on the above disclosure. All of the components of the above embodiments and all of the features described in the claims may be individually extracted and combined as long as they do not contradict each other.

What is claimed is:
1. An assembly comprising a plurality of stator vanes provided rearward of a plurality of rotor blades, a stator vane of the plurality of stator vanes comprising:
   an airfoil body having an airfoil cross section, wherein
   a maximum airfoil thickness position of the airfoil body in the airfoil cross section satisfies following conditions at least on a tip side of the airfoil body:
   (a) on a plane expanded in a circumferential direction in which the plurality of stator vanes are arranged, the maximum airfoil thickness position is located in a region between a trailing edge of the airfoil body and an intersection of the airfoil body, wherein the intersection is between the airfoil body and a line which is parallel to an extension line of a camber line of a rotor blade of the plurality of rotor blades at a trailing edge of the rotor blade of the plurality of rotor blades, the extension line also passes through a leading edge of a circumferentially adjacent stator vane of the plurality of stator vanes, and (b) the maximum airfoil thickness position is located in a region between a position of a chord ratio 0.2 and a chord ratio 0.8, and the chord ratio is a value obtained by dividing a distance from the leading edge of the airfoil body to a position on a chord of the airfoil body by a full length of the airfoil body chord.

2. The assembly according to claim 1, wherein the airfoil body has the airfoil cross section in which the maximum airfoil thickness position satisfying the conditions, from the tip side of the airfoil body to a hub side of the airfoil body.

3. The assembly according to claim 2, wherein the chord ratio of the maximum airfoil thickness position on the tip side of the airfoil body is larger than the chord ratio of the maximum airfoil thickness position on the hub side of the airfoil body.

4. The assembly according to claim 3, wherein the plurality of stator vanes are fan stator vanes.

5. The assembly according to claim 2, wherein the plurality of stator vanes are fan stator vanes.

6. The assembly according to claim 1, wherein the plurality of stator vanes are fan stator vanes.

7. An aircraft gas turbine engine comprising:
the assembly according to claim 1, the plurality of stator vanes being a plurality of fan stator vanes, and the plurality of rotor blades being a plurality of fan blades;
a fan case accommodating the plurality of fan blades; and
a core case configured to accommodate a core engine provided rearward of the plurality of fan blades and defines a bypass passage of a working fluid between the core case and the fan case, wherein
the plurality of stator vanes are provided in the bypass passage.

* * * * *